United States Patent [19]
Yoneyama

[11] Patent Number: 5,959,769
[45] Date of Patent: Sep. 28, 1999

[54] BINOCULARS HAVING CORRECTION DEVICE CORRECTING ALIGNMENT ERRORS INTRODUCED IN THE OPTICAL AXIS DURING ASSEMBLY

[75] Inventor: Masatoshi Yoneyama, Izumi, Japan

[73] Assignee: Minolta Co., Ltd., Osaka, Japan

[21] Appl. No.: 08/914,770

[22] Filed: Aug. 20, 1997

[30] Foreign Application Priority Data

Aug. 23, 1996 [JP] Japan ................................. 8-222057

[51] Int. Cl.⁶ ........................... G02B 27/64; G02B 23/00
[52] U.S. Cl. ........................................ 359/407; 359/557
[58] Field of Search ................................. 359/407, 412, 359/417, 554, 557

[56] References Cited

U.S. PATENT DOCUMENTS

| | | | |
|---|---|---|---|
| 5,311,354 | 5/1994 | Kamiya et al. | 359/426 |
| 5,672,862 | 9/1997 | Ohara et al. | 250/204 |

FOREIGN PATENT DOCUMENTS

0636916  7/1994  European Pat. Off. .

*Primary Examiner*—Cassandra Spyrou
*Assistant Examiner*—Mark A. Robinson
*Attorney, Agent, or Firm*—McDermott, Will & Emery

[57] ABSTRACT

Binoculars allow easy alignment of optical axes and correction of parallax in accordance with the distance of an object. The binoculars have correction lenses in right and left optical systems, and perform image-blur correction by moving the correction lenses in directions perpendicular to the optical axes and thereby inclining the optical axes. The binoculars also perform parallax correction by moving the correction lenses in accordance with the object distance and thereby inclining the optical axes such that the object images are kept at the centers of the right and left fields of view. Alignment errors that remain in the optical axes after assembly are eliminated by moving the correction lenses. This elimination of alignment errors is done every time the binoculars are used.

12 Claims, 11 Drawing Sheets

FOR CLOSE OBJECTS        FOR FAR OBJECTS

FIG.8B

FOR CLOSE OBJECTS        FOR FAR OBJECTS

BINOCULARS HAVING CORRECTION DEVICE CORRECTING ALIGNMENT ERRORS INTRODUCED IN THE OPTICAL AXIS DURING ASSEMBLY

BACKGROUND OF THE INVENTION

1. Field of the Invention

The present invention relates to binoculars, and particularly to binoculars equipped with an image-blur correction mechanism.

2. Description of the Prior Art

Figure 13:
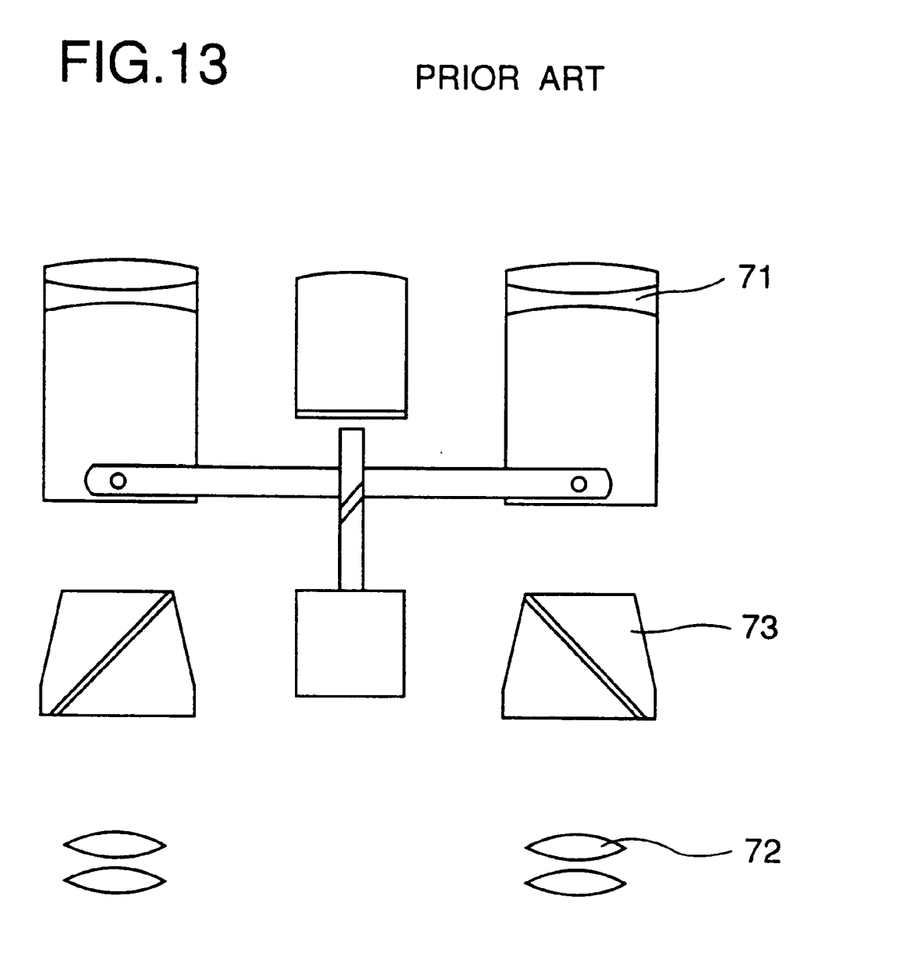
FIG. 13 is a diagram schematically showing the optical construction of conventional binoculars.

A pair of binoculars is provided with two, right-hand and left-hand, optical systems, which are generally arranged such that their optical axes are symmetrical with each other. FIG. 13 shows the construction of a most typical type of binoculars in which each of the right and left optical systems consists of an objective lens 71, an eyepiece lens 72, and an image-erecting prism 73. Conventionally, alignment of the optical axes of binoculars is conducted at the last stage of the assembly process by a skilled worker, who, while observing an image through the binoculars, aligns manually the positions of optical components one by one or in groups until they are fixed in the best possible positions. In particular, the right and left objective lenses are arranged such that their optical axes are on the same plane and parallel to each other.

Recent years have seen the development of such binoculars that are equipped with an image-blur correction mechanism so that the observed image will not be blurred even if a shaking occurs, or such binoculars that are equipped with, in addition to an image-blur correction mechanism, an automatic focus adjustment function so that the focus position is adjusted automatically in accordance with the distance of the observed object as measured by the binoculars. Image-blur correction is usually achieved by providing correction lenses in the optical paths between the objective lenses and the eyepiece lenses, and driving those correction lenses to tilt the optical axes such that an image blur is canceled out. Even with binoculars incorporating such advanced features, alignment of the optical axes of the right and left optical systems is still conducted manually as ever.

With binoculars having permanently fixed optical axes, a remote object can be observed without any problem, because the image of the object is formed substantially at the center of the field of view of each of the right and left optical systems. However, as the object comes closer, its image moves away from the center, with the result that the image of a very close object is formed out of the field of view of each of the right and left optical systems. This problem is due to parallax, and can be solved by tilting the right and left optical axes in accordance with the object distance. Various methods for tilting the right and left optical axes are known; for example, European Patent Application No. EP 0 636 916 A1 discloses a technique of tilting optical axes by use of an image-blur correction mechanism.

Conventional optical-axis alignment, which is conducted manually throughout up to its final fine-alignment step, not only demands a great deal of time, but also tends to leave small alignment errors, making it difficult to realize the optical performance as designed.

SUMMARY OF THE INVENTION

An object of the present invention is to provide binoculars of which the optical axes can be aligned easily and in which parallax can be corrected in accordance with the object distance.

To achieve the above object, according to one aspect of the present invention, in an optical apparatus having a correction device that corrects an image blur occurring during use of the apparatus by adjusting an optical axis of an optical system of the apparatus, alignment errors introduced in the optical axis during assembly of the apparatus are eliminated by the correction device.

According to another aspect of the present invention, binoculars having a correction device that corrects an image blur occurring during use of the binoculars by adjusting optical axes of optical systems of the binoculars are provided with a distance measurement device for measuring distance of an object to be observed; and an adjusting device for instructing the correction device to adjust the optical axes of the optical systems in accordance with the measured distance such that an area targeted by the distance measurement device is observed in fixed positions within right and left fields of view.

According to still another aspect of the present invention, binoculars having a correction device that corrects an image blur occurring during use of the binoculars by adjusting optical axes of optical systems of the binoculars are provided with a reading device for reading alignment errors introduced in the optical axes during assembly of the binoculars; and a distance detection device for detecting distance of an object to be observed. And in this binoculars, the optical axes of the optical systems are aligned by operating the correction device in accordance with alignment errors read by the reading device and distance detected by the distance detection device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
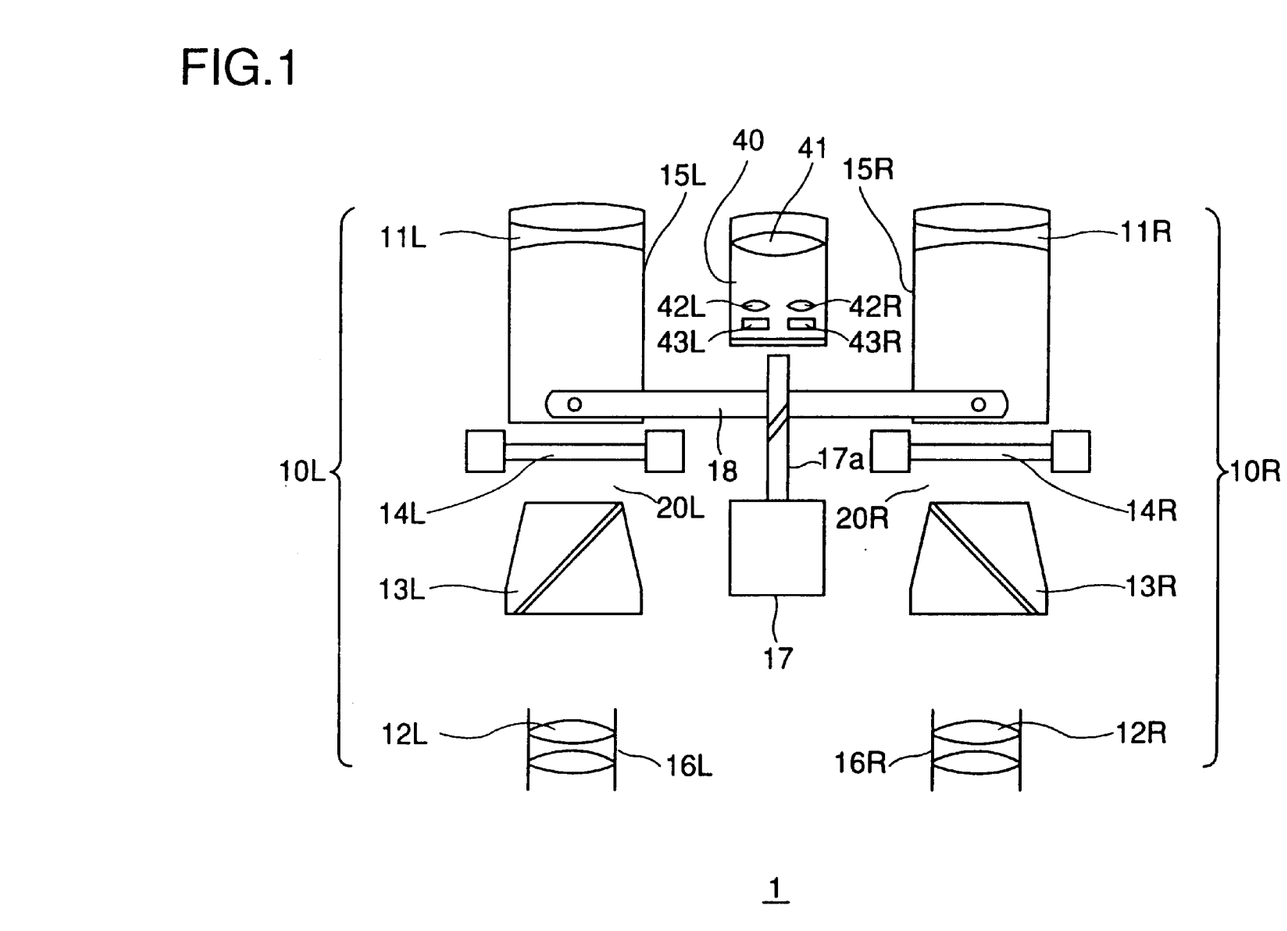
FIG. 1 is a diagram schematically showing the optical construction of binoculars embodying the present invention.

FIG. 1 schematically shows the optical construction of binoculars embodying the present invention. Here, the binoculars 1, besides being equipped with an image-blur correction function, have automatic focus adjustment capability as well. The image-blur correction function is used to correct an image blur caused by such vibration of the binoculars as occurs when the binoculars are used while being held with the hands of the user or fixed to a car or other that generates vibration. The binoculars 1 are provided with right and left optical systems 10R and 10L, of which the right optical system 10R is composed of an objective lens 11R, an eyepiece lens 12R, a prism 13R, and a correction lens 14R, and the left optical system 10L is composed of an objective lens 11L, an eyepiece lens 12L, a prism 13L, and a correction lens 14L.

The right and left objective lenses 11R and 11L, are firmly held inside lens barrels 15R and 15L, respectively. The lens barrels 15R and 15L are held inside the body of the binoculars so as to be movable linearly back and forth. As the lens barrels 15R and 15L are moved back and forth, the objective lenses 11R and 11L move together, and thereby the focus positions of the right and left optical systems 10R and 10L are adjusted.

The lens barrels 15R and 15L are coupled together by an arm 18 that is, at both ends, firmly attached to the lens barrels 15R and 15L. The arm 18 is designed to move back and forth with the rotation of the rotary spindle 17a of a motor 17. Thus, the arm 18 converts the rotary movement of the motor 17 to linear movement, and transmits it to the lens barrels 15R and 15L. As a result, for both of the optical systems 10R and 10L, the focus is adjusted by the motor 17 at the same time and by the same amount.

The right and left eyepiece lenses 12R and 12L are firmly held inside cylindrical lens barrels 16R and 16L, respectively. The left lens barrel 16L is fixed inside the body of the binoculars. On the other hand, the right lens barrel 16R has its outer surface formed into a helicoid, and is held inside the body of the binoculars so as to be movable back and forth when rotated circumferentially. When the right lens barrel 16R is rotated and thereby moved back and forth, the position of the right eyepiece lens 12R relative to the left eyepiece lens 12L is adjusted in the forward/backward direction. This allows the user to adjust the dioptric power difference between the right and left optical systems 10R and 10L to the dioptric power difference between the user's right and left eyes.

The right and left prisms 13R and 13L reverse the light beams they receive from the objective lenses 11R and 11L both vertically and horizontally so that erect images can be observed through the eyepiece lenses 12R and 12L. The right and left prisms 13R and 13L are fixed inside the body of the binoculars.

Figure 2A:
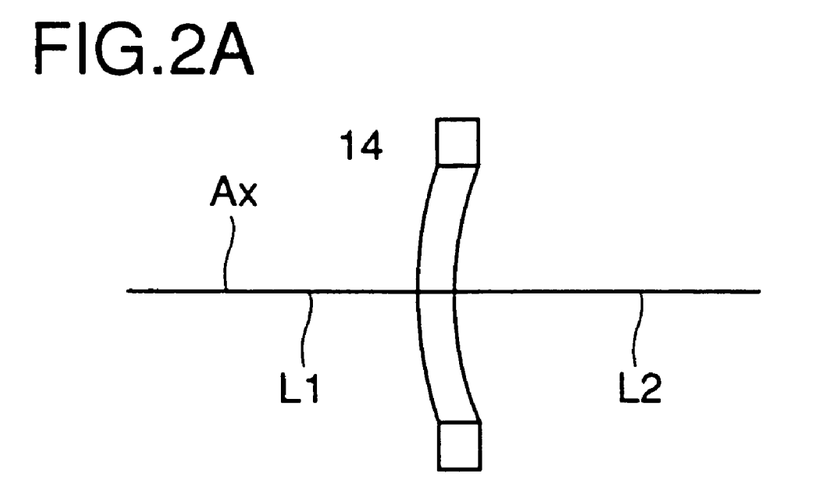
FIGS. 2A and 2B are diagrams showing the construction and workings of the correction lens used in the binoculars.
Figure 2B:
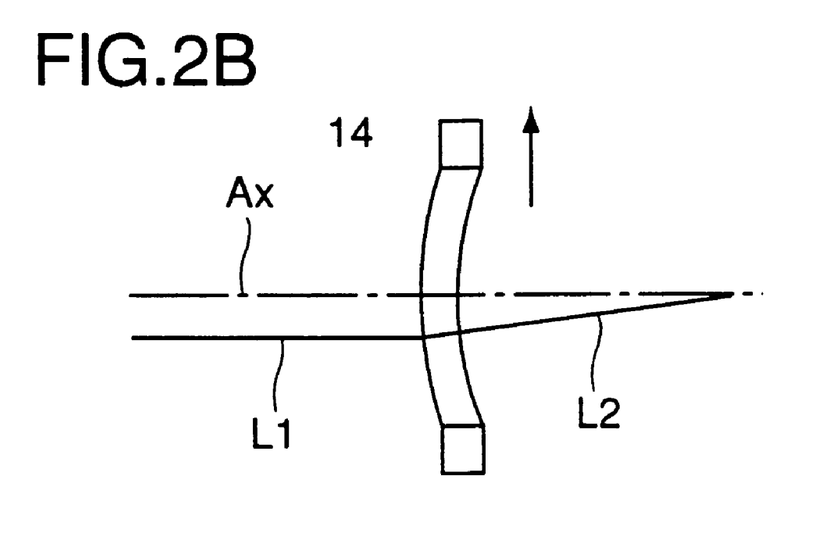

FIGS. 2A and 2B show the construction and wordings of the correction lenses 14R and 14L used in the binoculars of the embodiment. The binoculars of the embodiment employ as the correction lenses a lens 14 that has a convex surface on one side and a concave surface on the other side. FIG. 2A shows the state in which the axis of the incident light beam L1 coincides with the optical axis Ax of the correction lens 14, and the axis of the exiting light beam L2 also coincides with the optical axis Ax. By contrast, FIG. 2B shows the state in which the correction lens 14 is shifted in a direction perpendicular to the optical axis Ax from its position shown in FIG. 2A. Here, although the axis of the incident light beam L1 is parallel to the optical axis Ax, the light beam L1 is refracted toward the optical axis Ax as it passes through the correction lens 14, with the result that the exiting light beam L2 intersects the optical axis Ax. Assume that, in an optical system provided with such a correction lens 14, all of its optical components are aligned such that their optical axes coincide with one another. Then, by decentering the correction lens 14, that is, by moving it in a direction perpendicular to the common optical axis, it is possible to tilt the optical axis of the optical system as a whole.

Figure 3:
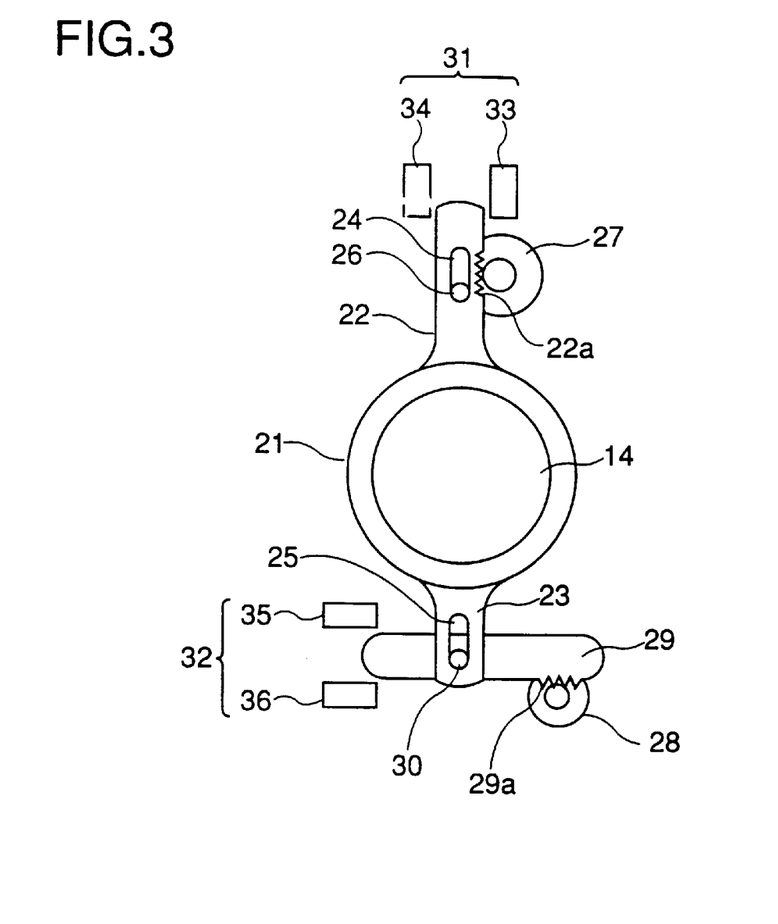
FIG. 3 is a diagram showing the construction of the image-blur correction mechanism of the binoculars.

The right and left optical systems 10R and 10L are provided with image-blur correction mechanisms 20R and 20L, respectively. FIG. 3 shows the construction of the image-blur correction mechanisms 20R and 20L. Each image-blur correction mechanism is composed of a correction lens 14, a lens frame 21 for holding the correction lens 14, a guide pin 26, two motors 27 and 28, a slide bar 29 with a guide pin 30, and two position sensors 31 and 32.

The lens frame 21 has upper and lower arms 22 and 23 extending upward and downward, respectively, and the arms 22 and 23 have guide grooves 24 and 25 formed vertically in them. The guide pin 26 is, at one end, fixed to the body of the binoculars, and, at the other end, placed in the guide groove 24 of the upper arm 22. The motor 27 is placed near the guide pin 26, and has a gear on its rotary spindle. Correspondingly, the upper arm 22 has teeth 22a formed at its edge near the guide groove 24, and these teeth 22a are engaged with the gear on the rotary spindle of the motor 27.

The motor 28, too, has a gear on its rotary spindle, and this gear is engaged with teeth 29a formed at the lower edge of the slide bar 29. The slide bar 29 is fitted to the body of the binoculars so as to be movable laterally, and moves laterally with the rotation of the motor 28. The guide pin 30 is, at one end, fixed to the slide bar 29, and, at the other end, placed in the guide groove 25 of the lower arm 23 of the lens frame 21.

The lens frame 21 moves vertically along the line through the guide pins 26 and 30 with the rotation of the motor 27, and moves laterally about the guide pin 26 with the rotation of the motor 28. Thus, the vertical and lateral movement directions of the lens frame 21 are substantially perpendicular to each other, and the combination of its movement in these two directions makes it possible to move the correction lens 14 in any direction.

The position sensor 31 is composed of a light-emitting diode 33 and a line sensor 34 placed opposite each other. Between the light-emitting diode 33 and the line sensor 34, the end of the upper arm 22 of the lens frame 21 is allowed to move in. As the upper arm 22 moves farther in, the line sensor 34 receives less light from the light-emitting diode 33, and this makes it possible to detect the vertical position of the correction lens 14. Likewise, the position sensor 32 is composed of a light-emitting diode 35 and a line sensor 36, between which one end of the slide bar 29 is allowed to move in. Thus, on the basis of how much light the line sensor 36 receives from the light-emitting diode 35, the lateral position of the correction lens 14 is detected.

As shown in FIG. 1, the binoculars 1 have a distance measurement unit 40 in their front-central portion. The distance measurement unit 40 measures the distance of an object through phase-difference detection. The distance measurement unit 40 is composed of a lens 41, right and left imaging lens 42R and 42L, and right and left line sensors 43R and 43L. In the distance measurement unit 40, two marginal light beams extracted from the light beam incoming through the lens 41 are focused by the imaging lenses 42R and 42L on the line sensors 43R and 43L, respectively.

Figure 4:
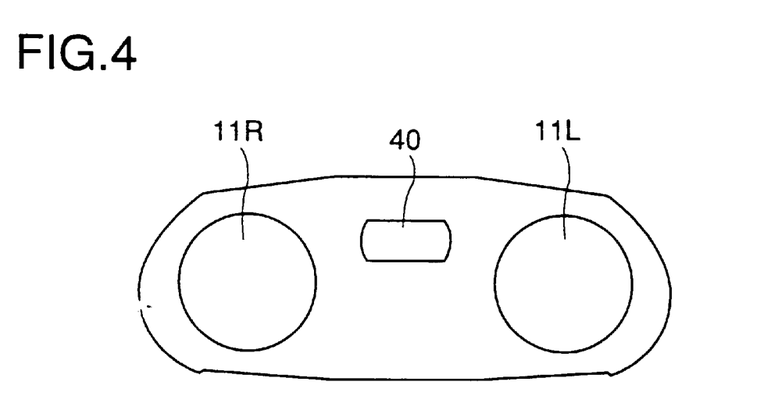
FIG. 4 is a front view of the binoculars.

FIG. 4 is a front view of the binoculars 1. As shown in FIG. 4, the distance measurement unit 40 is placed above the centers of the right and left objective lenses 11R and 11L. This is because the binoculars 1 are designed to adjust their pupil-distance by folding their body about its center line, and, to achieve this, a folding shaft (not shown) is provided just between the right and left optical systems 10R, and 10L.

Figure 5:
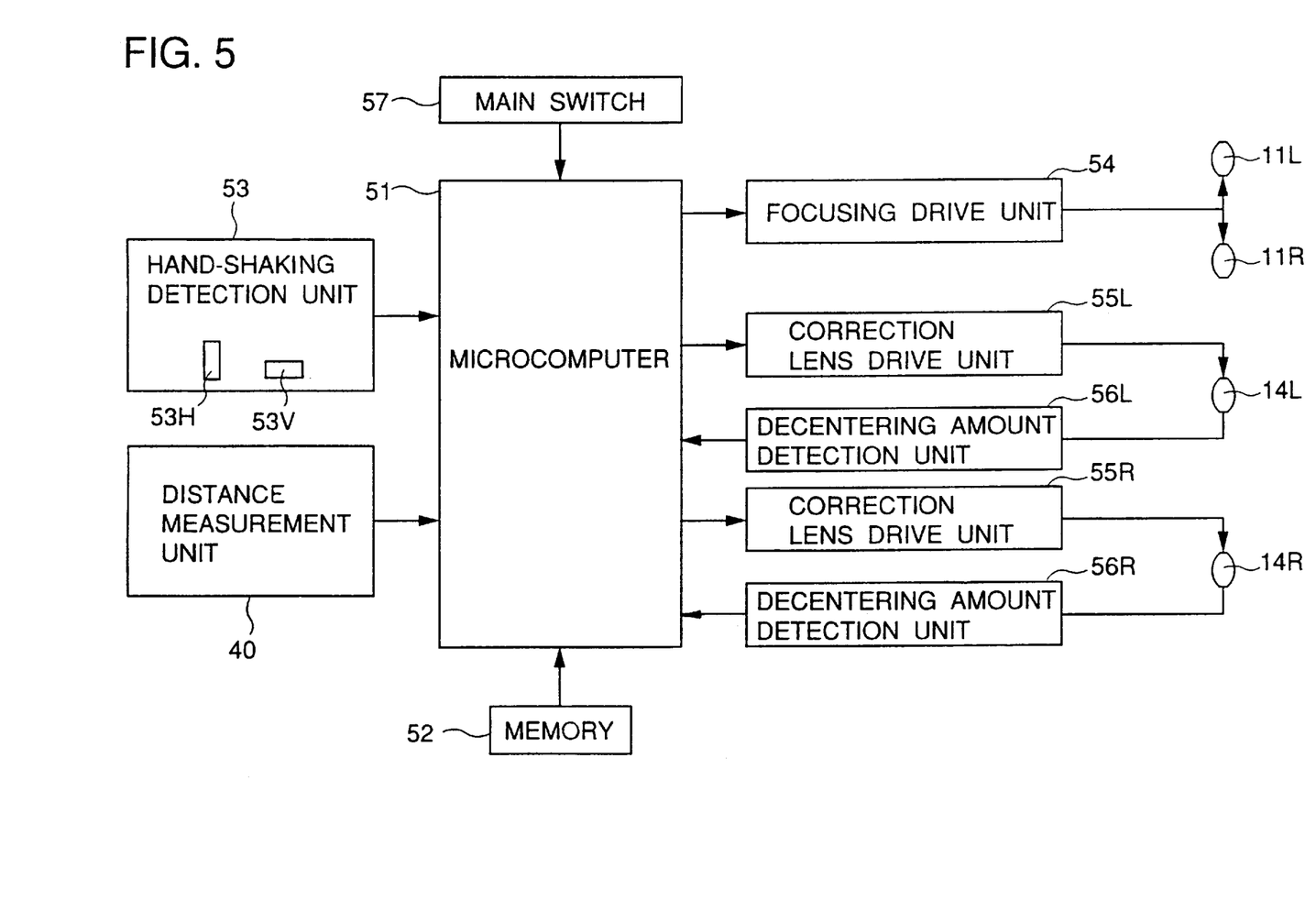
FIG. 5 is a block diagram showing the construction of the circuitry for performing image-blur correction and automatic focus adjustment in the binoculars.

As mentioned earlier, the binoculars 1 are provided with both an image-blur correction function and an automatic focus adjustment function. FIG. 5 is a block diagram showing the construction of the circuitry for achieving these functions. The binoculars 1 are provided with a microcomputer 51 serving as a controller. The microcomputer 51 is connected with a memory 52, the distance measurement unit 40, a shaking detection unit 53, a focusing drive unit 54, right and left correction lens drive units 55R and 55L, right and left decentering amount detection units 56R and 56L, and a main switch 57. Although not shown in the figure, the binoculars 1 are provided also with a battery for supplying electric power to the microcomputer 51 and other components. The supply of power is controlled by the main switch 57.

The microcomputer 51, by being fed with output signals of the line sensors 43R and 43L of the distance measurement unit 40, detects the positions in which the image of the observed object is formed in the right and left optical systems 10R, and 10L, and, from the distance between the right and left images, calculates the distance of the object. Then, in accordance with the calculated object distance, the microcomputer 51 drives the motor 17, which constitutes the focusing drive unit 54, to set the focus positions of the right and left optical systems 10R and 10L to the corresponding positions. This sequence of operations for automatic focus adjustment is repeated as long as the main switch is in the "ON" position.

The shaking detection unit 53 is provided with two angular velocity sensors 53H and 53V each composed of a piezoelectric vibration gyro. The angular velocity sensors 53H and 53V detect the angular velocity of the rotational movement of the binoculars 1 in a horizontal plane and in a vertical plane, respectively. The microcomputer 51, by being fed with output signals of the angular velocity sensors 53H and 53V, integrates the detected angular velocities to calculate angles that represent shaking amounts in the horizontal and vertical planes. Then, the microcomputer 51 drives the motors 27 and 28, which respectively constitute the right and left correction lens drive units 55R and 55L, to align the optical axes of the right and left optical systems 10R and 10L such that the calculated shaking amounts in the horizontal and vertical planes are canceled out.

A shaking may or may not involve inclination of the optical axes. A shaking that is not accompanied with inclination of the optical axes causes only so slight movement of the observed image that it is not perceived as an image blur. For example, a shaking that moves the binoculars by 1 mm corresponds to movement of 1 mm of the object. However, even if the object at a distance of a few meters or more moves by 1 mm, the observed image is scarcely affected. The effect on the observed image of a shaking that is not accompanied with inclination of the optical axes decreases as the object is located farther.

By contrast, a shaking that is accompanied with inclination of the optical axes, even if that inclination is slight, causes large movement of the observed image. For example, when the object is located at a distance of 10 m, a shaking that inclines the binoculars by 1° corresponds to movement of 17 cm of the object. The effect on the observed image of a shaking that is accompanied with inclination of the optical axes increases as the object is located farther.

In the binoculars 1 of the embodiment, angular velocity sensors are used to detect the rotation angles of the binoculars in shaking detection. This makes it possible to cancel out a shaking that is accompanied with inclination of the optical axes and thus causes large movement of the observed image. As a result, an image blur is corrected effectively, and the user can observe stable images. Note that the binoculars may be provided not only with angular velocity sensors, but also with velocity sensors or acceleration sensors so that a shaking that is not accompanied with inclination of the optical axes will be detected as well.

The decentering amount detection units 56R and 56L are respectively constituted of the position sensors 31 and 32, and serve to detect the decentering amount of the correction lenses 14R and 14L both in the vertical direction and in the horizontal direction. To align the optical axes of the right and left optical systems 10R and 10L, the microcomputer 51 first refers to the output signals of the decentering amount detection units 56R and 56L, and then drives the motors 28 and 29 of the correction lens drive units 55R and 55L. As a result, the optical axes are aligned precisely.

Figure 6:
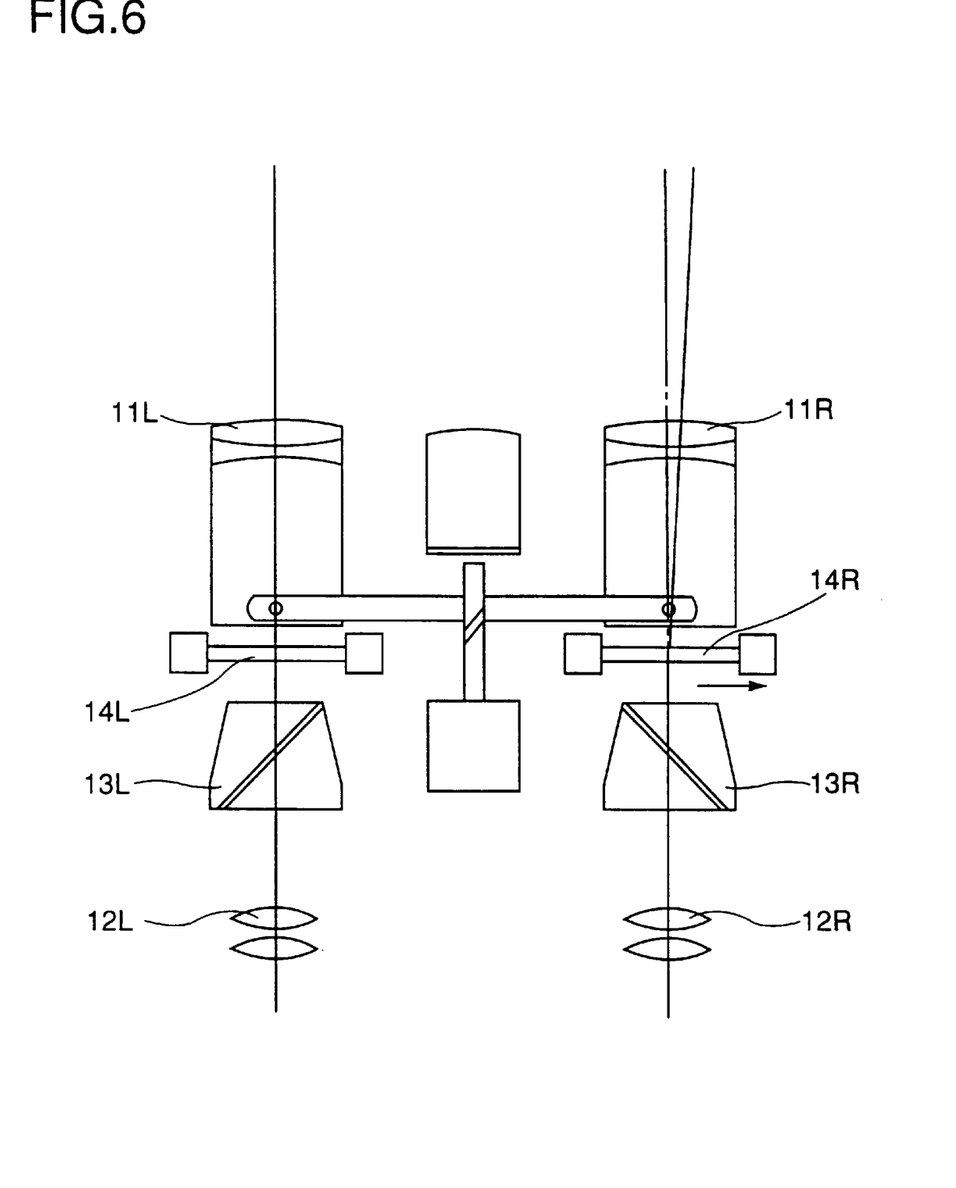
FIG. 6 is a diagram showing how alignment errors of the optical axes are eliminated by the image-blur correction mechanism in the binoculars.

In the binoculars 1 of the embodiment, the image-blur correction mechanisms 20R and 20L are used not only to correct an image blur when the binoculars are in use, but also to eliminate alignment errors of the optical axes introduced when the optical systems are assembled. FIG. 6 shows how alignment errors of the optical axes are eliminated by the image-blur correction mechanisms 20R and 20L. In FIG. 6, which shows an example of the state of the binoculars after their assembly, the actual optical axis (the solid line) of the right objective lens 11R is inclined outward relative to its ideal optical axis (the dash-and-dot line). In this case, by moving the right correction lens 14R in the direction indicated by the arrow, the actual optical axis of the right optical system 10R can be made to coincide with its ideal optical axis that is parallel to the optical axis of the left optical system 10L.

Since the right and left correction lenses 14R and 14L are each movable in the horizontal direction as well as in the vertical direction, it is possible to correct any inclination of the optical axes of the right and left optical systems 10R and 10L relative to each other. In this way, it is possible to eliminate alignment errors that remain in the right and light optical axes after mechanical assembly of the binoculars.

Figure 7:
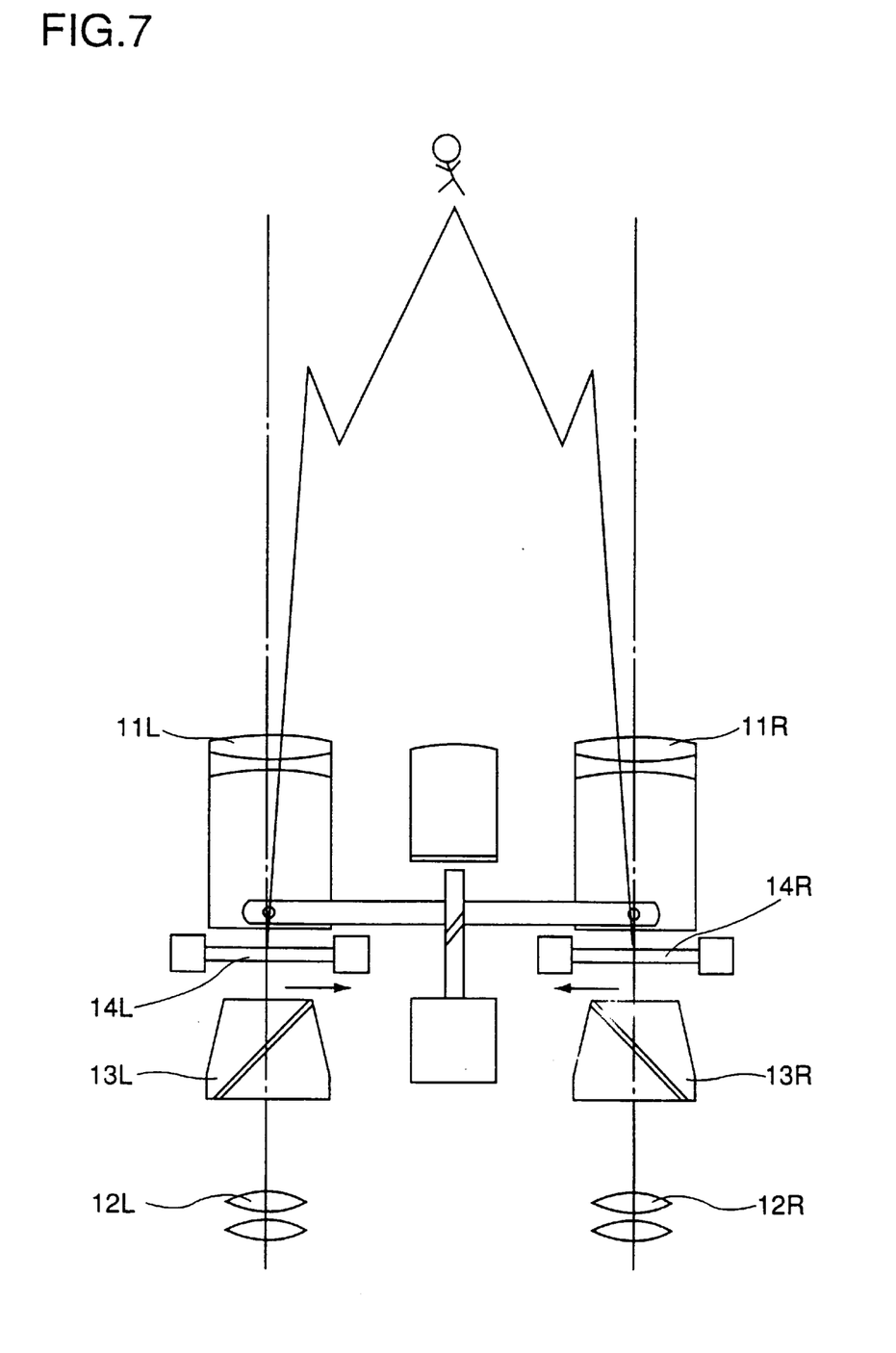
FIG. 7 is a diagram showing how the directions of the right and left fields of view are adjusted by the image-blur correction mechanism in the binoculars.

Moreover, the image-blur correction mechanisms 20R and 20L are used also to correct parallax between the right and left optical systems 10R and 10L, that is, to adjust the directions of the right and left fields of view in accordance with the distance of the observed object. FIG. 7 shows how the directions of the right and left fields of view are adjusted. As a result of the optical-axis alignment after the assembly, the optical axes (the dash-and-dot lines) of the right and left optical systems 10R and 10L are made parallel to each other. In this state, an object at an infinite distance is observed at the centers of the right and left fields of view, whereas an object at a closer distance is observed to the right of the center of the left field of view and to the left of the center of the right field of view.

When the right and left correction lenses 14R and 14L are moved in the directions indicated by the arrows to incline the optical axes of the right and left optical systems 10R and 10L inward, then the directions of the right and left fields of view incline inward accordingly. As a result, the images observed in the right and left fields of view each move outward from the positions in which they are observed when the right and left optical axes are parallel. The distances of the movement of the images depend on the distances of the movement of the correction lenses 14R and 14L, and accordingly, by controlling the positions of the correction lenses 14R and 14L in accordance with the object distance, it is possible to keep the object images at the centers of the right and left fields of view. Specifically, since the binoculars 1 are provided with a distance measurement unit 40 for automatic focus adjustment, the correction lenses 14R and 14L are moved in accordance with the object distance as measured by the distance measurement unit 40.

As shown in FIG. 4, the distance measurement unit 40 is placed above the centers of the right and left objective lenses 11R and 11L. Accordingly, parallax occurs not only horizontally between the right and left optical systems 10R and 10L, but also vertically between those optical systems and the distance measurement unit 40. For this reason, even when the correction lenses 14R and 14L are moved laterally in the directions indicated by the arrows in FIG. 7, the areas targeted for distance measurement do not come at the centers of the right and left fields of view but are shifted upward therefrom. Since, as a result of automatic focus adjustment, the areas targeted for distance measurement are observed most distinctly, thus user feels it unnatural if these areas are not observed at the centers of the fields of view.

In the binoculars 1 of the embodiment, the adjustment of the directions of the right and left fields of view is so performed that the areas targeted for distance measurement come at the centers, vertically, of the fields of view. To achieve this, the right and left correction lenses 14R and 14L are moved upward, that is, in FIG. 7, in the direction approaching the reader. The distance of the movement in this direction of the correction lenses 14R and 14L is determined in accordance with the object distance as well as the distance between the distance measurement unit 40 and the plane including the optical axes of the right and left optical systems 10R and 10L.

Figure 8A:
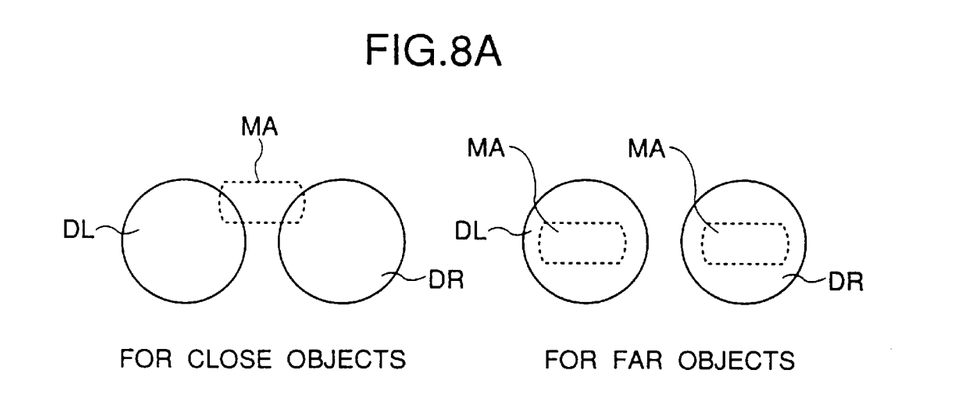
FIGS. 8A and 8B are diagrams showing how the areas targeted for distance measurement are located within the fields of view.
Figure 8B:
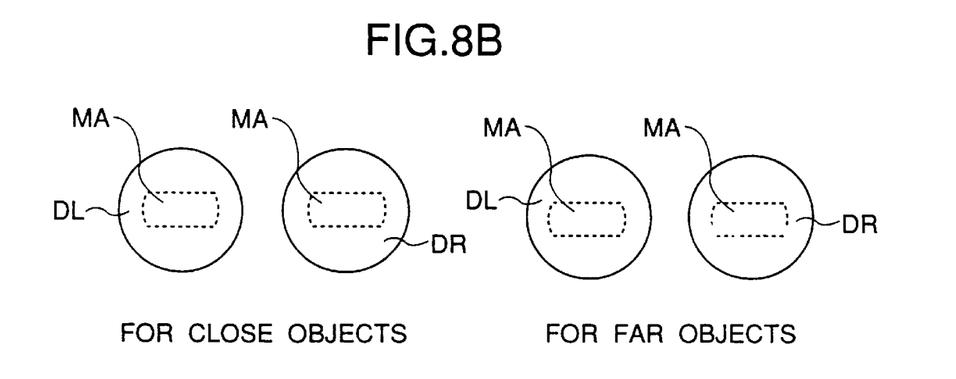

FIGS. 8A and 8B show how the areas targeted for distance measurement are located within the fields of view. In these figures, MA represents the targeted areas, and DL and DR represent the left and right fields of view, respectively. FIG. 8A shows the state in which no correction of parallax is done, and FIG. 8B shows the state in which correction of parallax is done as described above. When no correction of parallax is done, it is only when the object is located considerably far that the object is observed at the centers of the right and left fields of view and the distinct areas targeted for distance measurement are observed at the centers of the fields of view. When correction of parallax is done, regardless of the object distance, the object is observed always at the centers of the right and left fields of view.

Figure 9:
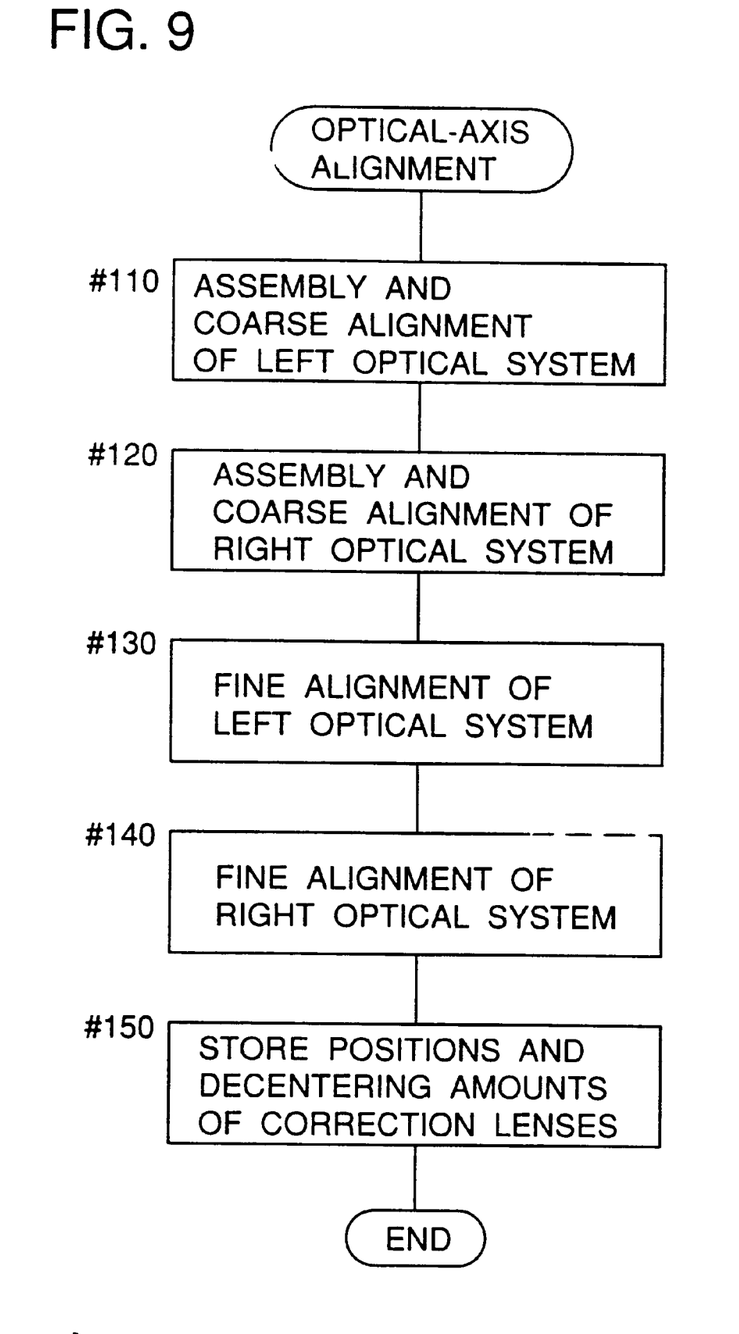
FIG. 9 is a flowchart showing the procedure for aligning the optical axes of the right and left optical systems as followed in the assembly process of the binoculars.

With reference to the flowchart shown in FIG. 9, a description will be given as to the procedure for aligning the optical axes of the right and left optical systems 10R and 10L as followed in the assembly process of the binoculars 1 of the embodiment. First, the right and left optical systems 10R and 10L are assembled from their respective optical elements, and are subjected to coarse, mechanical alignment of the optical axes (steps #110 and #120). Here, ideally, the optical axes of the right and left objective lenses 11R and 11L should be made parallel to each other, and the optical axes of the right and left objective lenses 11R and 11L should be made to coincide with the optical axes of the right and left correction lenses 14R and 14L, for example. However, since no optical element or support member is ever completely free from production errors, and since the alignment at this stage is done only mechanically, it is difficult to align the optical axes precisely enough. Accordingly, here, the optical elements are simply aligned and fixed such that their position and angle come within designed tolerances.

Next, the right and left optical systems 10R and 10L are subjected to fine alignment of the optical axes (#130 and #140). The alignment here is done electrically by the use of the image-blur correction mechanisms. Specifically, after the completion of the coarse alignment, for each of the right and left image-blur correction mechanism 20R and 10L, the motor 27 or 28 is driven in minute steps to move the correction lens 14 in minute steps in the horizontal and vertical directions until the optical axes are brought closest to their ideal state. Since the coarse alignment does not always succeed in making the right and left optical systems 10R and 10L symmetrical with each other, the fine alignment cannot be done uniformly for the right and left optical systems 10R and 10L. As a result, the alignment amounts RθO and LθO for the right and left optical axes are different.

After the fine alignment, the positions of the correction lenses 14R and 14L, which are now closest to their ideal state, are read by the decentering amount detection units 56R and 56L. Then, the obtained positions of the correction lenses 14R and 14L and the optical-axis alignment amounts RθO and LθO are stored in the memory 52 (#150). Thus, the optical-axis alignment to be done in the assembly process is completed. The memory 52 is realized with a memory of the non-volatile type that does not lose its contents when the supply of power thereto is shut off.

The fine alignment is done electrically, and therefore the optical elements are not fixed as a result. Accordingly, once the correction lenses 14R and 14L are moved to achieve image-blur correction and then the supply of power is shut off, the optical axes of the right and left optical systems 10R and 10L are held in a state different from their ideal state just after the optical-axis alignment. However, by reading the positions of the correction lenses 14R and 14L that are stored in the memory 52, the optical axes of the right and left optical systems 10R and 10L can be at any time aligned back to the state in which they are free from errors as just after the assembly.

Figure 10:
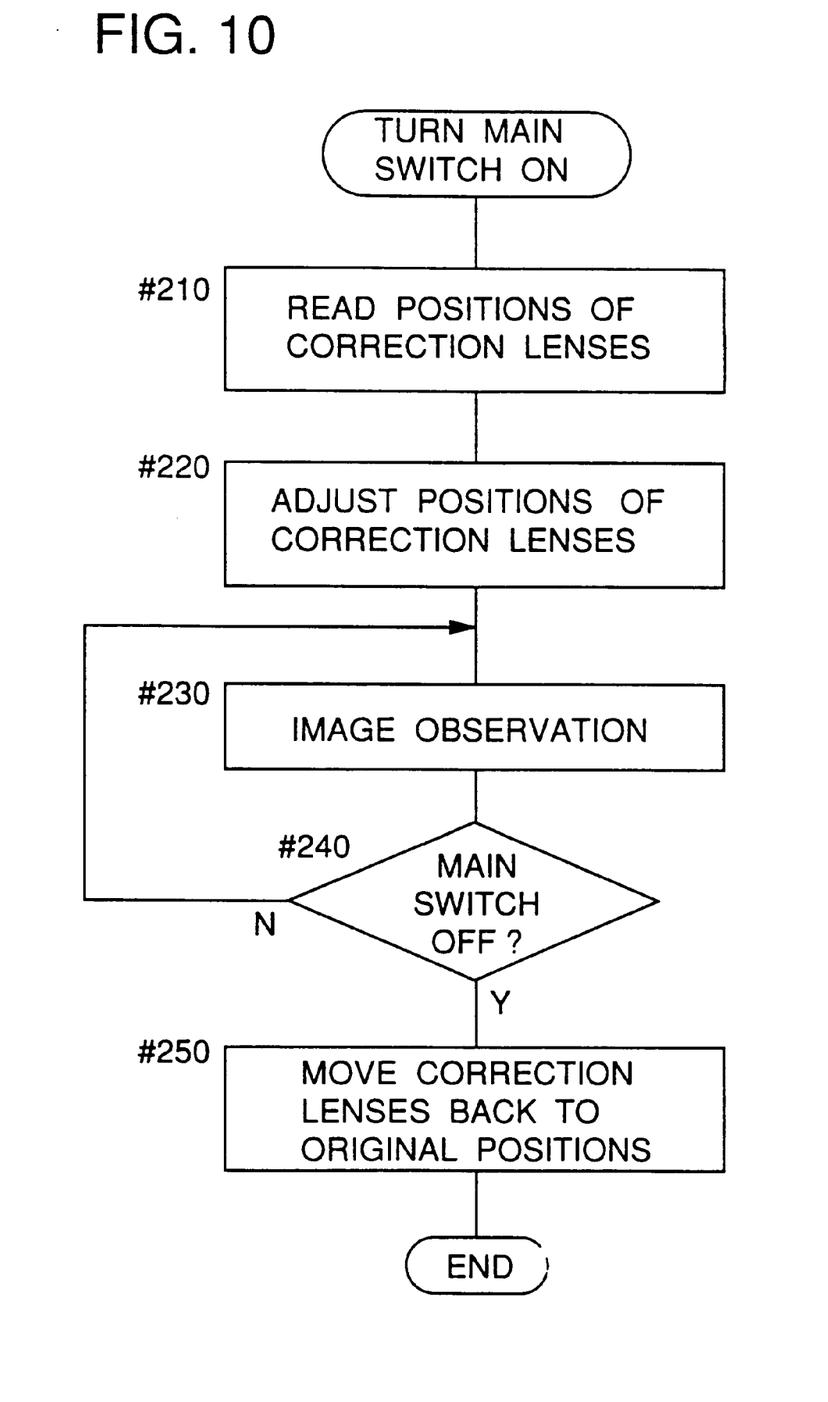
FIG. 10 is a flowchart showing the procedure for aligning the optical axes as followed when the binoculars are in use.

With reference to the flowchart shown in FIG. 10, a description will be given as to the procedure for aligning the optical axes as followed when the binoculars 1 of the embodiment are in use. When the main switch 57 is set to the "ON" position, the supply of power from a power source is started, and the microcomputer 51 starts control operations.

First, the positions of the right and left correction lenses 14R and 14L are read from the memory 52 (step #210). Next, while monitoring the outputs of the decentering amount detection units 56R and 56L, the correction lens drive units 55R and 55L move the correction lenses 14R and 14L in the horizontal and vertical directions so that they are positioned in the positions as read from the memory 52 (#220). Meanwhile, even if the shaking detection unit 53a detects a shaking, its output is ignored. As a result, the optical axes of the right and left optical systems 10R and 10L are brought into the state in which they are free from errors as just after the assembly.

Thereafter, ordinary operations for image observation, such as automatic focus adjustment as well as image-blur correction and parallax correction through optical-axis alignment, are started (#230). These operations for image observation are continued until the main switch 57 is set to the "OFF" position (#240). When the main switch 57 is set to the "OFF" position, then, just as in #220, the right and left correction lenses 14R and 14L are moved to the positions as read from the memory 52 (#250), and subsequently the procedure ends by shutting the supply of power off.

In #250, the correction lenses 14R and 14L are moved back to their original positions. This means that, in #250, the right and left optical systems 10R and 10L are brought back to the state in which they were before being subjected to optical-axis alignment in #230. As a result, even if the binoculars 1 are used without performing automatic focus adjustment or image-blur correction, image observation is possible with the optical axes in the aligned state as just after the fine alignment after the assembly.

Figure 11:
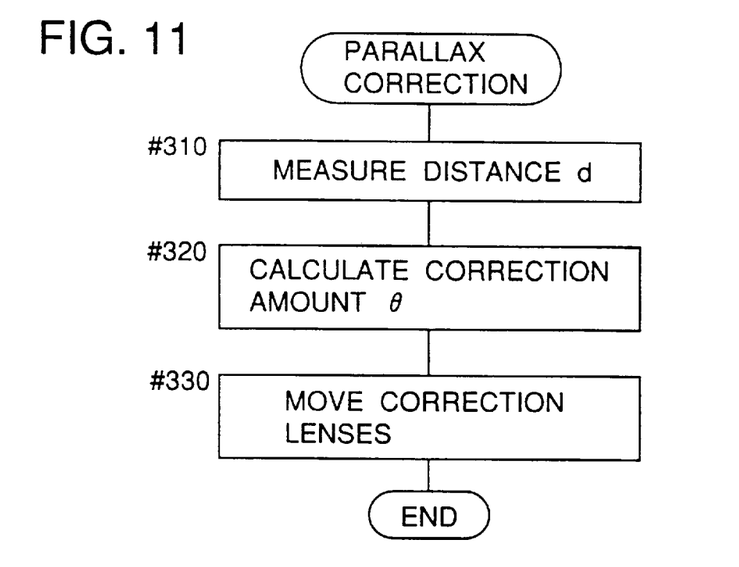
FIG. 11 is a flowchart showing the procedure for setting the directions of the right and left fields of view as followed during image observation through the binoculars.

FIG. 11 shows the procedure for correcting parallax, that is, for setting the directions of the right and left fields of view in accordance with the object distance as followed during image observation through the binoculars 1 of the embodiment. This procedure is performed concurrently with the procedure for automatic focus adjustment. First, the distance measurement unit 40 measures the distance d of the object (step #310), and, in accordance with the measured distance d, the correction amount θ by which the optical axes are to be inclined in order to position the areas targeted for distance measurement by the distance measurement unit 40 at the centers of the right and left fields of view is calculated (#320). This correction amount θ is a function of the distance d, and therefore can be expressed as θ=f1 (d). Here, it is also necessary to consider geometric conditions related to the arrangement of the right and left optical systems 10R and 10L and of the distance-measurement optical system, and therefore the function f1 includes various parameters as to their arrangement.

Next, the positions of the correction lenses 14R and 14L that achieve the calculated optical-axis correction amount θ are calculated, and then, while monitoring the outputs of the decentering amount detection units 56R and 56L, the correction lens drive units 55R and 55L move the correction lenses 14R and 14L in the horizontal and vertical directions (#330). As a result, the areas targeted for distance measurement are positioned at the centers of the right and left fields of view. Moreover, since the object is caught in the areas targeted for distance measurement, it is observed at the centers of the right and left fields of view. At this time, the right and left images of the object include parallax in accordance with the object distance, and this parallax gives the user a sense of distance to the object. Note that, for parallax correction, the optical axes of the right and left optical systems 10R and 10L are inclined by the same amount so that the two optical axes will remain symmetrical with each other.

Figure 12:
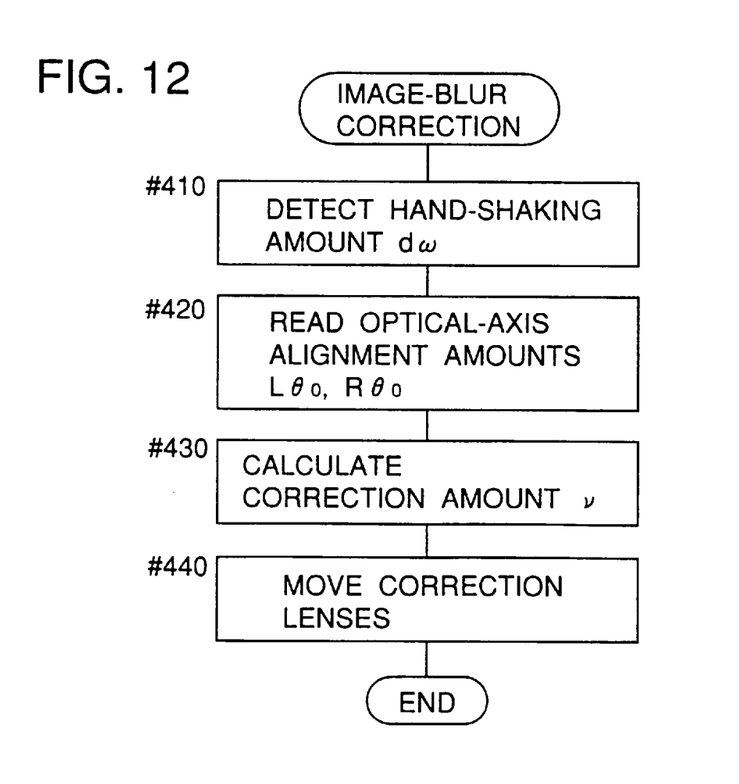
FIG. 12 is a flowchart showing the procedure for image-blur correctiones followed during image observation through the binoculars.

FIG. 12 shows the procedure for image-blur correction as followed during image observation through the binoculars 1 of the embodiment. First, in accordance with the output of the shaking detection unit 53, the shaking amount dω (amount of rotation) in a horizontal plane and in a vertical plane is calculated (Step #410). The correction amount v by which the right and left optical axes are to be inclined in order to cancel out the image blur needs to be calculated not only in accordance with the shaking amount dω, but also in consideration of the object distance d, the optical-axis alignment amounts Rθ0 and Lθ0 at the time of the fine alignment, and the correction amount θ for parallax correction. Accordingly, next, the optical-axis alignment amounts Rθ0 and Lθ0 stored in the memory 52 are read out (#420).

Then, the correction amount v for image-blur correction is calculated in accordance with the calculated shaking amount dω, the optical-axis alignment amounts Rθ0 and Lθ0 read from the memory 52, the distance d calculated from the output of the distance measurement unit 40, and the correction amount θ for parallax correction (#430). The image-blur correction amount v is expressed by the function v=f2 (dω, d, θ, Rθ0, Lθ0), where the function f2 includes various parameters as to the arrangement of the right and left optical systems 10R and 10L.

Next, the positions of the correction lenses 14R and 14L that achieve the calculated correction amount v are calculated, and then, while monitoring the outputs of the decentering amount detection units 56R and 56L, the correction lens drive units 55R and 55L move the correction lenses 14R and 14L in the horizontal and vertical directions (#440). As a result, the object can be observed with images that are not influenced by a shaking and are therefore stable in terms of position. Note that, whereas the correction of parallax is performed symmetrically for the right and left optical systems 10R and 10L, the correction of an image blur is performed in the same direction for the two optical systems.

As described heretofore, the binoculars 1 of the embodiment are characterized in that they allow correction of an image blur, in that they allow the fine alignment of their optical axes after the assembly to be done electrically and thus precisely, and in that they allow correction of parallax in accordance with the object distance. The fine alignment of the optical axes and the correction of parallax do not require dedicated mechanisms, but are achieved by the use of the image-blur correction mechanism. Accordingly, the binoculars 1 of the embodiment can be realized with a construction that is almost as simple as the construction of conventional binoculars equipped only with an image-blur correction mechanism.

Although the above descriptions deal only with binoculars provided with an automatic focus adjustment function, the mechanisms and methods for parallax correction and for image-blur correction according to the embodiment can be applied not only to binoculars provided with an automatic focus adjustment function, but also to binoculars whose focus is adjusted manually by the user. For example, in such a case, the binoculars are provided with a detector for detecting the rotation amount of an operation ring that is rotated for focus adjustment, so that, from the detected rotation amount, the focus positions of the right and left optical systems are calculated, and, from the calculated focus positions, the distance of the object is calculated retrospectively. In this way, also in this case, it is possible to achieve parallax correction and image-blur correction in accordance with the object distance.

According to one aspect of the embodiment, it is possible to eliminate alignment errors that remain in the right and left optical axes of binoculars after their assembly, and thus it is possible to realize binoculars that provide optical performance just as designed. Moreover, alignment errors can be eliminated without the use of a dedicated means, and thus binoculars can be realized with a simple construction.

Furthermore, binoculars can always be used with their optical axes in a properly aligned state. Moreover, even if the optical axes cannot be aligned precisely enough at the time of assembly, they can be aligned precisely at the time of use, and thus it is possible to simplify assembly processes greatly and thereby reduce assembly time.

According to another aspect of the embodiment, in binoculars, it is possible to observe an object within the fields of view of the optical systems not only when the object is located far but even when it is located close. Moreover, the parallax between the right and left images is always consistent with the object distance, and thus the user can observe the object with images that give the user a natural sense of distance. As a result, the user can continue to observe the object with minimal eye strain. Moreover, no mechanism is additionally required other than a mechanism for image-blur correction in order to adjust the directions of the fields of view, and thus binoculars can be realized with a simple construction.

Furthermore, the areas for distance measurement are always positioned in fixed positions within the fields of view. Accordingly, the user can obtain an appropriate sense of distance just in that part of the object which the user wishes to observe, simply by adjusting the observation direction such that that part of the object comes in those fixed positions. Moreover, in binoculars provided with an automatic focus adjustment function, if their distance measurement means is used also for the adjustment of the directions of the fields of view, it is possible to bring images in the best focus just in that part of the object which the user wishes to observe, simply by adjusting the directions of the fields of view such that that part of the object comes in the above-noted fixed positions.

According to a still another aspect of the embodiment, binoculars not only provide high-quality images free from alignment errors between the right and left optical axes, but also allow the observation of a close object, and provide images including parallax that correctly reflects the object distance. In addition, the correction of an image blur can be performed properly without being affected by the elimination of alignment errors between the optical axes or the adjustment of parallax.

What is claimed is:

1. An optical apparatus comprising:
    a correction device that corrects an image blur occurring during use of the apparatus by adjusting an optical axis of an optical system of the apparatus,
    wherein alignment errors introduced in the optical axis during assembly are eliminated by the correction device, and
    wherein the correction device includes a correction lens provided in the optical system of the apparatus.

2. An optical apparatus as claimed in claim 1, further comprising a memory for storing information for eliminating the alignment errors.

3. An optical apparatus as claimed in claim 2,
    wherein the correction device eliminates the alignment errors in accordance with information stored in the memory.

4. An optical apparatus as claimed in claim 1,
    wherein the optical apparatus is binoculars.

5. Binoculars having a correction device that corrects an image blur occurring during use of the binoculars by adjusting optical axes of the optical systems of the binoculars, comprising:

a distance measurement device for measuring distance of an object to be observed; and
    an adjusting device for instructing the correction device to adjust the optical axes of the optical systems in accordance with the measured distance such that an area targeted by the distance measurement device is observed in fixed positions within right and left fields of view,
    wherein the correction device includes a correction lens provided in the optical systems.

6. Binoculars as claimed in claim 5,
    wherein the distance measurement device has a light-sensitive device and an optical system for directing light from the object to the light-sensitive device.

7. Binoculars as claimed in claim 6,
    wherein the optical system of the distance measurement device has its optical axis off a plane that includes optical axes of right and left objective optical systems.

8. Binoculars having a correction device that corrects an image blur occurring during use of the binoculars by adjusting optical axes of optical systems of the binoculars, comprising:
    a reading device for reading alignment errors introduced in the optical axes during assembly of the binoculars;
    a distance measurement device for detecting distance of an object to be observed,
    wherein the optical axes of the optical systems are aligned by operating the correction device in accordance with alignment errors read by the reading device and distance detected by the distance detection device, and
    wherein the correction device includes a correction lens provided in the optical systems.

9. Binoculars as claimed in claim 8, further comprising:
    a memory for storing information for eliminating the alignment errors,
    wherein the reading device reads information stored in the memory.

10. Binoculars as claimed in claim 8,
    wherein the correction device adjusts the optical axes of the optical systems in accordance with the measured distance such that an area targeted by the distance detection device is observed in fixed positions within right and left fields of view.

11. Binoculars as claimed in claim 8,
    wherein the distance detection device has a light-sensitive device and an optical system for directing light from the object to the light-sensitive device.

12. Binoculars as claimed in claim 11,
    wherein the optical system of the distance detection device has its optical axis off a plane that includes optical axes of right and left objective optical systems.

* * * * *